United States Patent
Hwang

(10) Patent No.: US 7,920,595 B2
(45) Date of Patent: *Apr. 5, 2011

(54) RADIO PROTOCOL FOR MOBILE COMMUNICATION SYSTEM AND METHOD

(75) Inventor: In Tae Hwang, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 805 days.

This patent is subject to a terminal disclaimer.

(21) Appl. No.: 11/849,218

(22) Filed: Aug. 31, 2007

(65) Prior Publication Data

US 2007/0297449 A1 Dec. 27, 2007

Related U.S. Application Data

(63) Continuation of application No. 10/656,161, filed on Sep. 8, 2003, now Pat. No. 7,583,699, which is a continuation of application No. 09/484,169, filed on Jan. 18, 2000, now Pat. No. 6,804,202, which is a continuation of application No. 09/439,612, filed on Nov. 12, 1999, now Pat. No. 6,788,652.

(30) Foreign Application Priority Data

Apr. 8, 1999 (KR) .................................. 1999-12255

(51) Int. Cl.
H04J 3/22 (2006.01)
(52) U.S. Cl. ...................................... 370/469; 370/474
(58) Field of Classification Search .................. 370/310, 370/329, 331, 336–349, 469, 474, 437; 455/422.1, 455/450–452.1

See application file for complete search history.

(56) References Cited

U.S. PATENT DOCUMENTS

| 5,289,469 | A | 2/1994 | Tanaka |
| 5,469,433 | A | 11/1995 | McAuley |
| 5,684,791 | A | 11/1997 | Raychaudhuri et al. |
| 5,946,634 | A | 8/1999 | Korpela |
| 6,307,867 | B1 | 10/2001 | Roobol et al. |
| 6,363,058 | B1 * | 3/2002 | Roobol et al. ................. 370/310 |
| 6,363,257 | B1 * | 3/2002 | Warwick ........................ 455/511 |
| 6,374,112 | B1 | 4/2002 | Widegren et al. |
| 6,385,451 | B1 | 5/2002 | Kalliokulju et al. |
| 6,434,133 | B1 * | 8/2002 | Hamalainen .................. 370/338 |
| 6,473,399 | B1 * | 10/2002 | Johansson et al. ............ 370/229 |

(Continued)

FOREIGN PATENT DOCUMENTS

KR 99-5966 1/1999
WO 98/48581 10/1998

OTHER PUBLICATIONS

Nikula, E. Toskala et al. "Frames multiple access for UMTS and IMT-2000"; Personal Communications, IEEE, Apr. 1998.

(Continued)

Primary Examiner — William Trost, IV
Assistant Examiner — Roberta A Shand
(74) Attorney, Agent, or Firm — Lee, Hong, Degerman, Kang & Waimey

(57) ABSTRACT

Radio protocol for a next generation mobile communication system is disclosed including a radio link control layer for connecting to an upper layer through a service access point provided in advance and for connecting to a lower layer through a plurality of logic channels provided in advance. The radio link control layer includes at least one radio link control entity for transmission/reception of data to/from up-link or down-link according to a form of a data transmission mode.

20 Claims, 4 Drawing Sheets

U.S. PATENT DOCUMENTS

| | | | |
|---|---|---|---|
| 6,473,411 B1 * | 10/2002 | Kumaki et al. | 370/331 |
| 6,477,670 B1 | 11/2002 | Ahmadvand | |
| 6,788,652 B1 | 9/2004 | Hwang | |
| 6,947,394 B1 | 9/2005 | Johansson et al. | |
| 7,583,699 B2 | 9/2009 | Hwang | |
| 2002/0065072 A1 * | 5/2002 | Lindh | 455/422 |
| 2002/0191562 A1 * | 12/2002 | Kumaki et al. | 370/331 |

OTHER PUBLICATIONS

Roobol, C. Beming et al. "A proposal for an RLC/MAC protocol for wideband CDMA capable of handling real time and non-real time services"; Vehicular Technology Conference, 1998. VTC 98. 48th IEEE; May 1998.

* cited by examiner

RADIO PROTOCOL FOR MOBILE COMMUNICATION SYSTEM AND METHOD

This is a Continuation Application of prior application No. 10/656,161 filed on Sep. 8, 2003, now U.S. Pat. No. 7,583,699 B2 issued on Sep. 1, 2009, which is a continuation of prior application Ser. No. 09/484,169 filed on Jan. 18, 2000, now U.S. Pat. No. 6,804,202 B1 issued on Oct. 12, 2004, which is a continuation of prior application Ser. No. 09/439,612, filed on Nov. 12, 1999, now U.S. Pat. No. 6,788,652 B1 issued on Sep. 7, 2004, whose entire disclosures are incorporated herein by reference. Furthermore, this application claims the benefit of Korean Application No. 12255/1999 filed on Apr. 8, 1999, which is hereby incorporated by reference.

BACKGROUND OF THE INVENTION

1. Field of the Invention

The present invention relates to a next generation mobile communication system and more particularly to a protocol on radio access standards based on Universal Mobile Telecommunication System (UMTS) being developed and standardized by the European Telecommunications Standard Institute (ETSI).

2. Background of the Related Art

Today, as the society is developed to a highly information oriented society, the communication network is developing to one unified radio system which can deal with all services. As a new communication field, though the mobile communication has been grown rapidly up to now, services of the mobile communication up to now are mostly for speech and are available only in restricted regions. However, it is foreseen that the future mobile communication system can transmit not only speech, but also even character, image, and multimedia information, and services of which will be made available any place in the world by means of an international perfect roaming. Particularly, since the joint development of a second generation mobile system called DCS-1800 which serves the Global System for Mobile Communication (GSM) at an 1800 MHz frequency band, Europe, lead by the ETSI, is under development of the UMTS.

The UMTS is a next generation mobile communication scheme developed independently based on the Code Division Tested (CODIT) and the Asynchronous Time Division Multiplexing Access (ATDMA), which are researches on the radio access standards of which UMTS is conducted as one of projects of the Research and Development in Advanced Communication Technology in Europe (RACE). Basically, the radio access standard protocol architecture suggested by the UTMS until now includes, from the bottom, a Physical Layer (PHY), a Medium Access Control Layer (MAC), a Radio Link Control Layer (RLC), a Radio Resource Control Layer (RRC), and a Higher Layer. However, those protocol layers are still being developed to be implemented in the next generation mobile communication service. That is, there have been ceaseless demand for selecting the appropriate protocol architecture which meets both the objective criterias of the radio access standards such as spectrum efficiency, range of service and power efficiency, and the subjective criteria of the radio access standards such as complexity of the system, service quality, flexibility of radio technology and network.

SUMMARY OF THE INVENTION

Accordingly, an object of the present invention is to solve at least the problems and disadvantages of the related art.

An object of the present invention is to provide a radio protocol for the next generation mobile communication system and a method for managing the mobile communication system. The radio protocol includes a RLC which conducts radio link control functions according to a data transmission mode for supporting a variety of the next generation mobile communication services which will be developed in the future.

Additional advantages, objects, and features of the invention will be set forth in part in the description which follows and in part will become apparent to those having ordinary skill in the art upon examination of the following or may be learned from practice of the invention. The objects and advantages of the invention my be realized and attained as particularly pointed out in the appended claims.

To achieve the objects and in accordance with the purposes of the invention, as embodied and broadly described herein, the radio protocol for a next generation mobile communication system includes a radio link control layer for connecting to an upper layer through a service access point provided in advance and for connecting to a lower layer through a plurality of logic channels also provided in advance. The radio link control layer includes at least one radio link control entity for transmission/reception of data to/from the up-link or down-link according to the form of the data transmission mode.

Preferably, the radio link control layer includes a RLC-transparent entity either for receiving an SDU from the upper layer, dividing the SDU into a plurality of PDUs and providing the PDUs to the lower layer, or for receiving the plurality of PDUs from the lower layer, reassembling the PDUs into an SDU and providing the SDU to the upper layer; a RLC-unacknowledged entity either for receiving the SDU from the upper layer, conducting framing in which the SDU is divided into a plurality of PDUs wherein a header is inserted into each of the PDUs and providing the PDUs to the lower layer, or for receiving a plurality of PDUs from the lower layer, separating a header from each of the PDUs, reassembling the PDUs into the SDU depending on presence of error and providing the SDU to the upper layer; and a RLC-acknowledged entity for correcting an error in the PDU or retransmitting the PDU depending on the presence of an error in the plurality of PDUs received from the lower layer.

The radio link control layer further includes a multiplexing/demultiplexing block for multiplexing and demultiplexing the PEDUs so that some of the provided radio link control entities are connected to the lower layer through the plurality of logic channels.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

In a radio protocol architecture for the next generation mobile communication system, a MAC switches transport channels according to a monitoring result of a channel state to process multiple dedicated logical channels. Also, the Frequency Division Duplexing (FDD) or the Time Division Duplexing (TDD) may be implemented as the transmission-reception separating system in the next generation mobile communication system. The RLC protocol architecture of the present invention supports the FDD, and can also support the TDD for certain cases.

Figure 1:
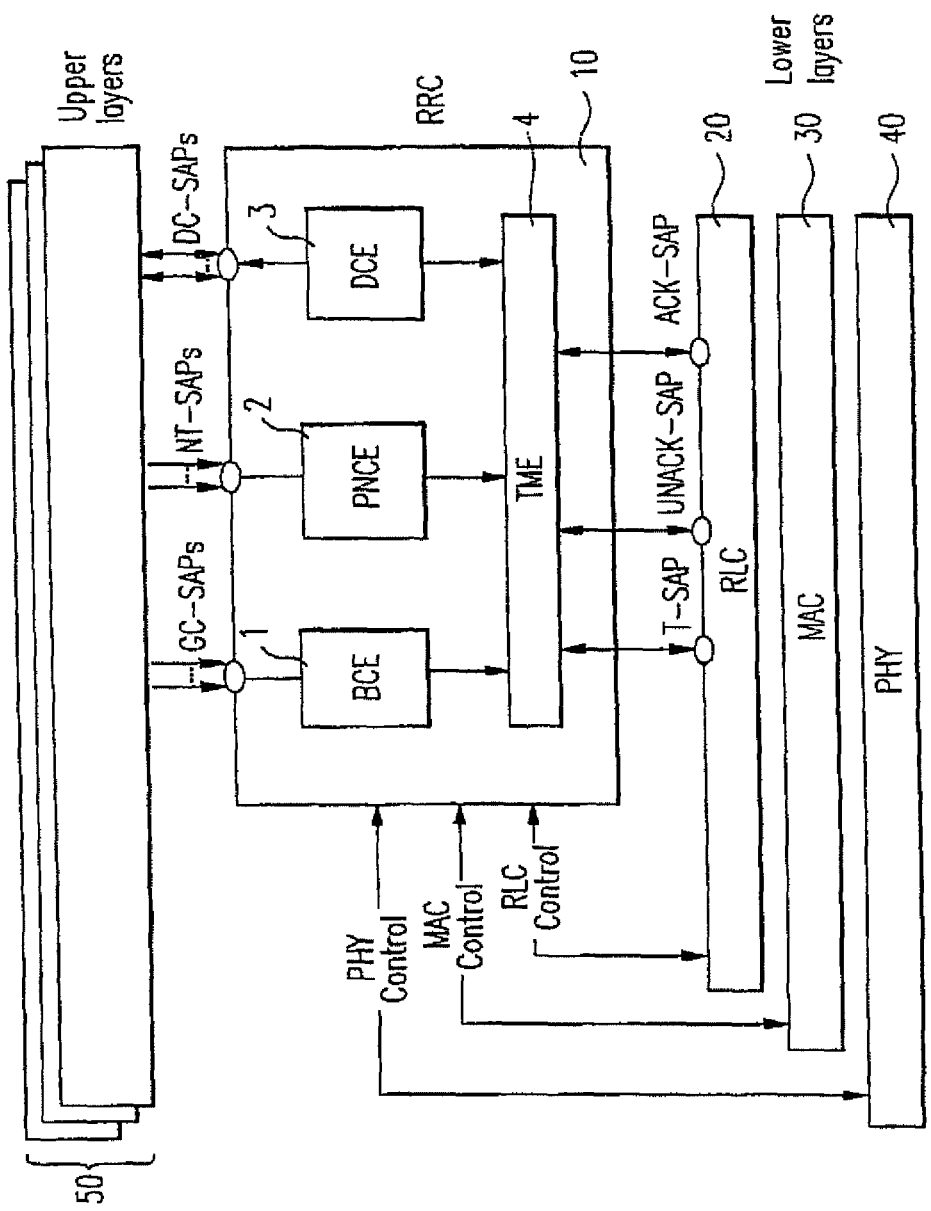
FIG. 1 is a block diagram showing a RRC for UTRAN in the next generation mobile communication system in accordance with the present invention.
Figure 2:
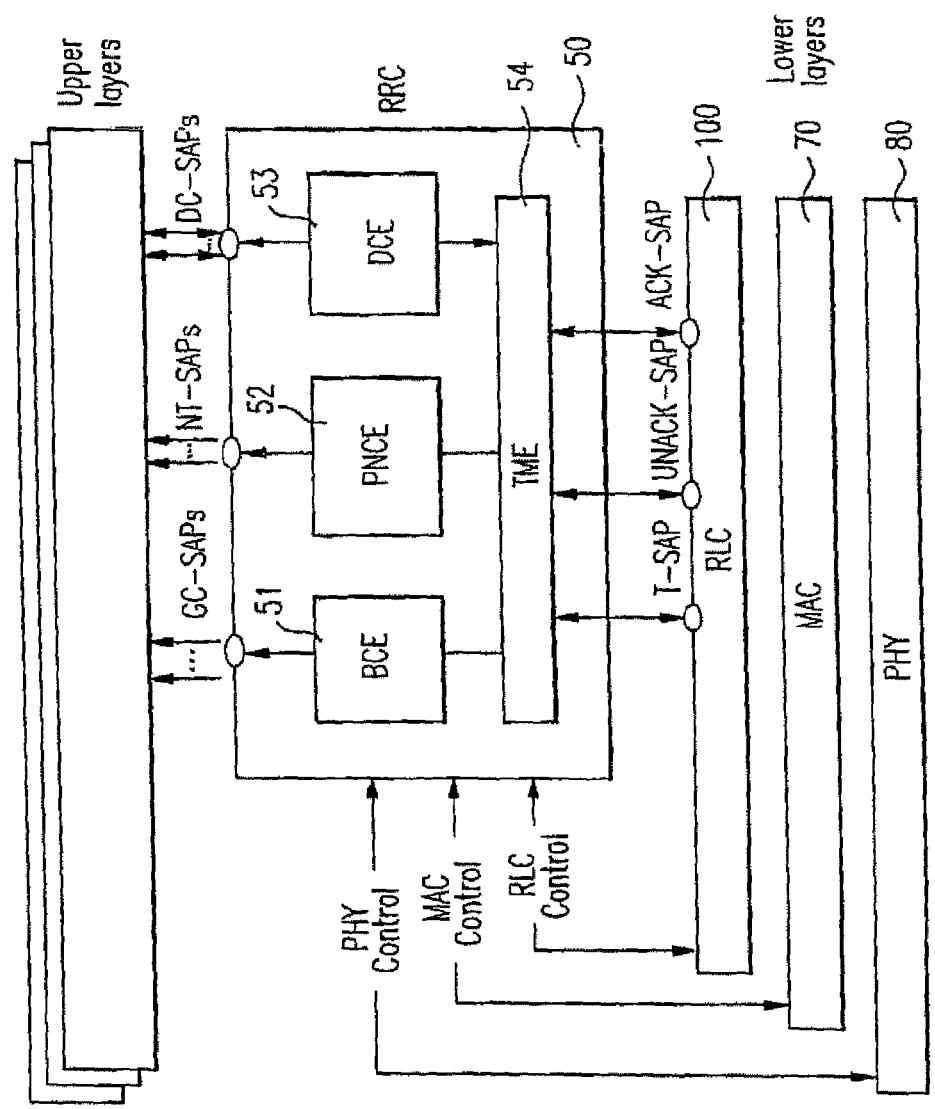
FIG. 2 is a block diagram showing a radio protocol architecture and RRC for UE in the next generation mobile communication system in accordance with the present invention in detail.

Reference will now be made in detail to the preferred embodiments of the present invention, examples of which are illustrated in the accompanying drawings. FIG. 1 illustrates a block diagram showing a detail of RRC for a Universal Terrestrial Radio Access Network (UTRAN) in a next generation mobile communication system in accordance with the present invention, and FIG. 2 illustrates a block diagram showing a radio protocol architecture and RRC for UE in a next generation mobile communication system in accordance with the present invention. The RRC architecture model of the present invention is provided for supporting a UMTS control plane and a FDD mode, and can also support a TDD mode.

Referring to FIG. 1, the RRC 10 in a communication system of the present invention provided for the next generation mobile communication system is disposed between an upper layer and a lower layer. The upper layer for radio transmission control and for mobile station management includes a Call Control (CC) entity, a Mobility Management (MM) entity, a Radio resource Management entity and a Packet Management entity. The lower layer includes a PHY 40, a MAC 30, and a RLC 200.

In this instance, the RRC 10 includes a Broadcast Control Entity (BCE) 11 for controlling broadcast information provided from a user side Access Stratum (AS) or Non Access Stratum (NAS), called an upper layer collectively; a Paging and Notification Control Entity (PNCE) 12 for providing paging and notification information from the upper layer; a Dedicated Control Entity (DCE) 13 for providing services on setting/canceling connection and transmission of a message from the upper layer; and a Transfer Mode Entity (TME) 14 for mapping (fixing a transport path) the BCE 11, the PNCE 12 and the DCE 13 to an access point of the RLC in the lower layer.

A method for controlling a radio resource by the aforementioned network side RRC of the present invention will be explained. The present invention suggests to provide separate entities for processing different messages according to the messages transferred between the RLC 200 and the upper layer or the lower layer, or between he upper layer and the lower layer.

First, characteristics of the message to be transported from the upper layer to the RRC are made known. The characteristics of the message to be transported from the upper layer to the RRC is determined. Namely, whether the message is broadcast message information, paging and notification information, or information on setting/canceling connection and transmission of a message. As a result of the determination, the broadcast message information is transmitted to the BCE 11, the paging and notification information is transmitted to the PNCE 2, and the information on setting/canceling connection and transmission of a message from the upper layer is transmitted to the DCE 13. The message provided to the RRC 10 is processed in one of the following three message processing procedure depending on a service function of the message. That is, the RRC 10 of the present invention has the BCE 11 for processing a message only required for transmission, the PNCE 12 for processing the paging message or the notification message, and the DCE 13 for processing an important message, such as a packet or speech.

The TME 14 next determines a transfer mode of the message processed in the preset signal processing procedure and determines a path for forwarding the message, i.e. conducts a mapping according to the characteristics and transfer mode of the message. That is, the TME 14 controls how to map from the BCE 11, the PNCE 12, or the DCE 13 in the RRC to an Service Access Point (SAP) (T-SAP, UNACK-SAP and ACK-SAP) of the RLC 200. In this instance, comparing the received message form and the present service form, the BCE 11 is mapped to either a Transparent-SAP (T-SAP) or an Unacknowledge-SAP (UNACK-SAP), the PNCE 12 is mapped to either the T-SAP or the UNACK-SAP, and the DCE 13 is mapped on one of the T-SAP, the UNACK-SAP or an Acknowledge-SAP (ACK-SAP).

The BCE 11 controls the demultiplexing of an upper layer message received by a peer entity from an another upper layer entity (for example, the user side MM entity), and controls the multiplexing of a lower layer message received from a sub entity (for example, a BCE in UTRAN) of the RLC 200. The BCE 11 supports an upper layer service using a General Control Service Access Points (GC-SAPs), and may use a lower layer (RLC 200) service provided by the T-SAP, or UNACK-SAP. In this instance, the T-SAP transmits a message from an upper layer to the RLC 200, and the UNACK-SAP requires no confirmation on received message.

The PNCE 12 controls demultiplexing of an upper layer message received by a peer entity from an another upper layer entity (for example, the user side (UE) MM entity), and controls the multiplexing of a lower layer message received from a sub entity (for example, a PNCE in UTRAN) of the RRC 10. The PNCE 12 supports the upper layers through a Notification-SAPs (NT-SAPs), and may use a lower layer (RLC 200) service provided through the T-SAP or UNACK-SAP. The DCE 13 controls the demultiplexing of an upper layer message received by a peer entity from another upper layer entity (for example, the MM entity in the user entity and a RNAP in network (UTRAN) side), and controls the multiplexing of a lower layer message received from a sub entity (for example, UE and a DCE in UTRAN side) of the RRC 10. The DCE 13 supports the upper layers through a Dedicated Control-SAPs (DC-SAPs), and can use a lower layer (RLC 200( service provided through the T-SAP, ACK-SAP, or UNACK-SAP.

The ACK-SAP transfers a message from the upper layer to the lower layer (RLC 200), and requests for confirmation on the message transfer, so that the upper layer makes confirmation on transfer of the message.

In a RRC in the UE use state as shown in FIG. 2, upon reception of a message at the RLC 100 in the lower layer, the RLC 100 determines characteristics of the message, and forwards the message to the TME 54 in RRC 50 through T-SAP, UNACK-SAP or ACK-SAP depending on the characteristics. The TME 54 transfers a message received through the T-SAP, UNACK-SAP, or ACK-SAP in the RLC 100 to one of the BCE 51, PNCE 52 and the DCE 53. That is, the message is transferred to respective entities 51, 52 and 53 depending on whether the message is a braodcast message, paging and notification message or a message, such as speech or packet. Then, the BCE 51, the PNCE 52 and the DCE 53 process the message signal according to the characteristics of the respective entities, and transfer the processed signal to the upper layer through the GC-SAPs, NT-SAPs and DC-SAPs in the RRC 50.

Figure 3:
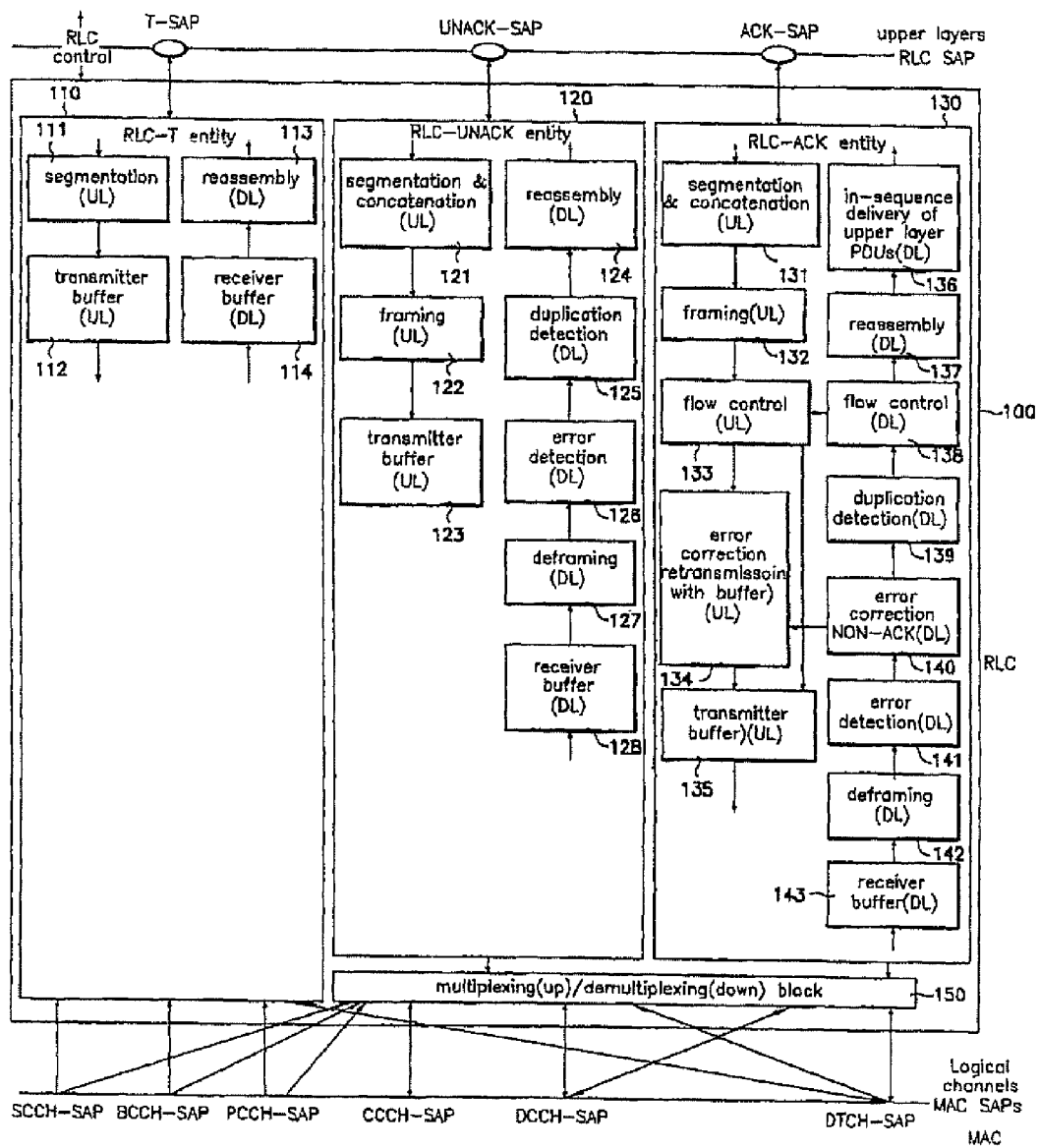
FIG. 3 is a block diagram showing a radio protocol architecture and RLC for UE in the next generation mobile communication system in accordance with the present invention in detail.
Figure 4:
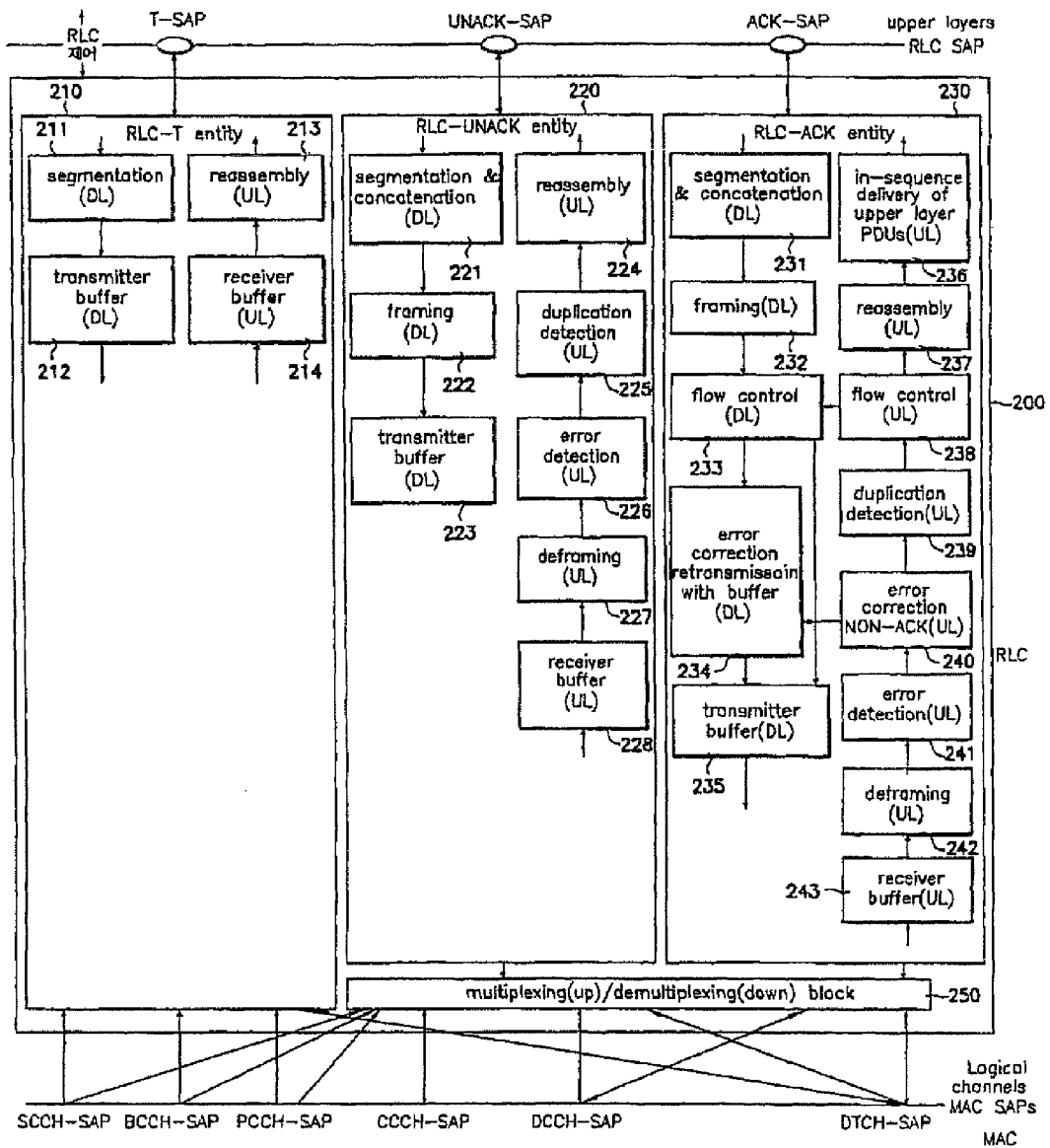
FIG. 4 is a block diagram showing a radio protocol architecture and RLC for ULTRAN in a next generation mobile communication system in accordance with the present invention in detail.

FIG. 3 illustrates a block diagram showing a radio protocol architecture and RLC for UE in a next generation mobile communication system in accordance with the present invention, and FIG. 4 illustrates a block diagram showing a radio protocol architecture and RLC for UTRAN in a next generation mobile communication system in accordance with the present invention. The present invention will be explained centered on FIG. 3 as the radio protocol of the UTRAN shown in FIG. 4 is almost the same with the radio protocol in the UE shown in FIG. 3.

Referring to FIG. 3, the RLC 100 is provided with different SAPs for access to the upper layer, such as T-SAP, UNACK-SAP and ACK-SAP. The 'LC control between the upper layer and the RLC 100 will be explained in detail. The entities 110, 120 and 130 in the RLC 100 have different forms of data transfer modes and functions. The RLC-Transparent (RLC-T) entity 110 controls a data flow to logic channels, such as SCCH, BCCH, PCCH and DTCH, through a logic channel SAP connected to the MAC. The RLC-T 110 is provided with both a segmentation block 111 and a transmitter buffer block 112 in an up-link from the UTRAN and, as will be explained later, a RLC-T 210 in FIG. 4 is also provided with a segmentation block 211 and a transmitter buffer block 212 in a down-link from the UE. The RLC-T 110 is also provided with a reassembly block 113 and a receiver buffer block 114 in a down-link from the UTRAN, and RLC-T 210 has a reassembly block 213 and a receiver buffer block 214 in an up-link from the UE.

When the UE is viewed as a transmitter side, the RLC-T 110 receives a Service Data Unit (SDU) from the upper layer at first. Then, the segmentation block 111 in the RLC-T divides the SDU into a plurality of Protocol Data Units (PDUs), each having no header, and transfers the PDUs to the MAC through the transmitter buffer block 112. Opposite to this, when the UE is viewed as a receiver side, the RLC-T entity 110 receives PDUs from the MAC through the receiver buffer block 114. Then, the reassembly block 113 in the RLC-T entity 110 reassembles the PDUs into SDUs and forwards the SDUs to the upper layer.

A RLC-Unacknowledged (RLC-UNACK) entity 120 controls a data flow to a logic channel, such as SCCH, BCCH, PCCH, CCCH and DTCH, through a logic channel SAP connected to the MAC. The RLC-UNACK entity 120 is provided with a segmentation and concatenation block 121, a framing block 122, and a transmitter buffer block 123, which are in an up-link to the UTRAN, and a RLC-UNACK entity 220 of FIG. 4 is also provided with a segmentation and concatenation block 221, a framing block 222, and a transmitter buffer block 223, which are in a down-link to the UE. Moreover, the RLC-UNACK entity 120 is provided with a reassembly block 124, a duplication detection block 125, an error detection block 126, a deframing block 127 and a receiver buffer block 128, which are in a down-link from the UTRAN, and the RLC-UNACK entity 220 is provided with reassembly block 224, a duplication detection block 225, an error detection lock 226, a deframing block 227, and a receiver buffer block 228, which are in a up-link from the UE.

When the UE is viewed as a transmitter side, the RLC-UNACK entity 120 receives the SDU from the upper layer at first. Then, the RLC-UNACK entity 120 divides the SDU into a plurality of PDUs, each having a header by framing, and forwards the PDUs to the MAC through the transmitter buffer block 123. In dividing the SDU into PDUs, a concatenation function is conducted at the same time, to appropriately divide the SDU into PDUs. The concatenation function is a procedure to insert a portion of a next data into a reserved space (PAD) in a PDU. Opposite to this, when the UE is viewed as a receiver side, the RLC-UNACK entity 120 receives the PDUs from the MAC through the receiver buffer block 128, separates headers from the PDUs received at the deframing block 127 in the RLC-UNACK, and detects presence of error in each PDU. If presence of error in the PDU is detected, the PDU is discarded and a presence of a duplicate PDU within PDUs from which no errors have been detected is detected. In this instance, if a duplicate PDU is detected as having no error, the duplicate PDU is provided to the reassembly block 124 once. The reassembly block 124 reassembles the received PDUs into the SDU again, and provides the SDU to an upper layer of the reassembly block.

The RLC-Acknowledged (RLC-ACK) entity 130 controls a data flow to a logic channel, such as DCCH and DTCH through a logic channel SAP connected to the MAC. The RLC-ACK entity 130 is provided with a segmentation and concatenation block 131, a framing block 132, a flow control block 133, an error correction and retransmission block 134 and a transmitter block 135, which are in an up-link to the UTRAN, and a RLC-ACK entity 230 of FIG. 4 also has corresponding identical blocks 231~235 in a down-link to the UE. Moreover, the RLC-ACK entity 130 has an in-sequence delivery of upper layer PDU block 136, a reassembly block 137, a flow control block 138, a duplication detection block 139, an error correction block 140, an error detection block 141, a deframing block 142 and a receiver buffer block 143, which are in a down-link from the UTRAN, and RLC-ACK entity 230 has corresponding identical blocks 236~243 in an up-link from the UE.

When the UE is viewed as a transmitter side, the RLC-ACK entity 130 receives an SDU from an upper layer at first. Then, the segmentation and concatenation block 131 in the RLC-ACK entity 130 divides the SDU into a plurality of PDUs, each having a header from framing. In dividing the SDU into the PDUs, a concatenation function is also conducted to appropriately divide the SDU into PDUs. According to this, the RLC 100 processes a transmission speed based on flow status information of peer RLC, and then detects acknowledgement on transmission of each PDU by the peer RLC. If the RLC 100 detects that there is no acknowledgement on transmission of each PDU, the RLC 100 should multiplex the present PDUs, and retransmit the PDU. Upon completion of the up-link operation of the RLC-ACK entity, the RLC 100 transfers the PDUs to the MAC through the transmission buffer 135.

Opposite to this, when the UE is viewed as a receiver side, the RLC-ACK entity 130 receives the PDUs from the MAC through the receiver buffer 143, separates headers from the PDUs received at the deframing block 142 and detects presence of error in each PDU. If there is an error in the PDU, the RLC 100 requests an unacknowledges peer RLC to retransmit a PDU, and detects a duplicate PDU. In this instance, if there is a PDU, the duplicated PDU is provided once to the flow control block 138. Thereafter, the RLC 100 provides flow status information to the peer RLC and maintains a PDU stream to be transmitted to an upper layer by reassembling the PDUs into SDU.

Table 1 shows functions of respective RLCs 110, 120 and 130 in the UE of FIG. 3. Also, Table 2 shows functions of respective RLCs 210, 220 and 230 in the UTRAN of FIG. 4.

In the present invention, the RLC 100 has additional functions other than the functions of the blocks explained with reference to FIGS. 3 and 4, and the RLC functions listed in Tables 1 and 2. The additional function is a framing/deframing, which is a function for controlling separation/combination of the header inserted in to PDU. The RLC architecture explained up to now is related to forms and RLC data transmission modes and RLC functions.

TABLE I

| | Entity | Function | Logic channel | SCCH | BCCH | PCCH | CCCH | DCCH | DTCH |
|---|---|---|---|---|---|---|---|---|---|
| Up-link (TX) | RLC-T entity | Segmentation | | | | | | | V V |
| | RLC-UNACKentity | Segmentation | | | | | V | V | V |
| | | Concatenation | | | | | V | V | V |
| | | Framing | | | | | V | V | V |
| | RLC-ACK entity | Segmentation | | | | | | V | V |
| | | Concatenation | | | | | | V | V |
| | | Framing | | | | | | V | V |
| | | Flow control | | | | | | V | V |
| | | Error correction (retransmission) | | | | | | V | V |
| Down-link (RX) | RLC-T entity | Reassembly | | V | V | V | | | V V |
| | RLC-UNACK entity | Deframing | | V | V | V | V | V | V |
| | | Error detection | | V | V | V | V | V | V |
| | | Duplication detection | | V | V | V | V | V | V |
| | | Reassembly | | V | V | V | V | V | V |
| | RLC-ACK entity | Deframing | | | | | | V | V |
| | | Error detection | | | | | | V | V |
| | | Error correction (NON-ACK) | | | | | | V | V |
| | | Duplication detection | | | | | | V | V |
| | | Flow control | | | | | | V | V |
| | | Reassembly | | | | | | V | V |
| | | In-sequence delivery of upper layer PDUs | | | | | | V | V |

TABLE 2

| | Entity | function | Logic channel | SCCH | BCCH | PCCH | CCCH | DCCH | DTCH |
|---|---|---|---|---|---|---|---|---|---|
| Up-link (TX) | RLC-T entity | Segmentation | | V | V | V | | | V V |
| | RLC-UNACKentity | Segmentation | | V | V | V | V | V | V |
| | | Concatenation | | V | V | V | V | V | V |
| | | Framing | | V | V | V | V | V | V |
| | RLC-ACK entity | Segmentation | | | | | | V | V |
| | | Concatenation | | | | | | V | V |
| | | Framing | | | | | | V | V |
| | | Flow control | | | | | | V | V |
| | | Error correction (retransmission) | | | | | | V | V |
| Down-link (RX) | RLC-T entity | Reassembly | | | | | | | V V |
| | RLC-UNACK entity | Deframing | | | | | V | V | V |
| | | Error detection | | | | | V | V | V |
| | | Duplication detection | | | | | V | V | V |
| | | Reassembly | | | | | V | V | V |
| | RLC-ACK entity | Deframing | | | | | | V | V |
| | | Error detection | | | | | | V | V |
| | | Error correction (NON-ACK) | | | | | | V | V |
| | | Duplication detection | | | | | | V | V |

TABLE 2-continued

| Entity function Logic channel | SCCH | BCCH | PCCH | CCCH | DCCH | DTCH |
|---|---|---|---|---|---|---|
| Flow control | | | | | V | V |
| Reassembly | | | | | V | V |
| In-sequence delivery of upper layer PDUs | | | | | V | V |

As has been explained, the radio protocol for the next generation mobile communication system of the present invention is favorable for implementing a variety of services in the next generation mobile communication system because the radio protocol of the present invention can carry out an effective radio link control between the RRC, an upper layer and the MAC, a lower layer, according to a RLC data transmission mode.

The foregoing embodiments are merely exemplary and are not be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for communicating data in a wireless communication system, the method comprising:
   setting, in an upper layer, a transfer mode for data to be transmitted, wherein the transfer mode indicates to layers below the upper layer whether to process the data to be transmitted according to at least one of an acknowledged mode or unacknowledged mode;
   receiving the data to be transmitted from the upper layer;
   processing the data according to the transfer mode set by the upper layer; and
   sending the processed data according to the transfer mode set by the upper layer to a lower layer for transmission.

2. The method of claim 1, wherein the data is received from the upper layer through a service access point.

3. The method of claim 1, wherein the transfer mode comprises a mode wherein a transmitting side is informed of a successful data transmission.

4. The method of claim 1, wherein processing the data comprises performing at least one of segmentation, concatenation, duplication detection, error detection and reassembly.

5. The method of claim 1, wherein the data received from the upper layer comprises a service data unit.

6. The method of claim 1, wherein processing the data comprises generating a protocol data unit.

7. The method of claim 1, wherein the lower layer comprises a physical layer.

8. The method of claim 1, further comprising transmitting the processed data to a network.

9. The method of claim 1, further comprising transmitting the processed data to one or more mobile terminals.

10. The method of claim 1, further comprising transmitting the processed data via broadcast to one or more mobile terminals.

11. The method of claim 10, wherein the transfer mode comprises an unacknowledged mode.

12. A method for communicating data in a wireless communication system, the method comprising:
   setting, in an upper layer, a transfer mode for data to be transmitted, wherein the transfer mode indicates to layers below the upper layer whether to process the data to be transmitted according to one of an acknowledged mode or unacknowledged mode;
   receiving the data to be transmitted from the upper layer through a service access point;
   processing the data according to the transfer mode set by the upper layer, wherein the transfer mode comprises one of the acknowledged mode or unacknowledged mode; and
   sending the processed data according to the transfer mode set by the upper layer to a lower layer for transmission.

13. The method of claim 12, wherein processing the data comprises performing at least one of segmentation, concatenation, duplication detection, error detection and reassembly.

14. The method of claim 12, wherein the data received from the upper layer comprises a service data unit.

15. The method of claim 12, wherein processing the data comprises generating a protocol data unit.

16. The method of claim 12, wherein the lower layer comprises a physical layer.

17. The method of claim 12, further comprising transmitting the processed data to a network.

18. The method of claim 12, further comprising transmitting the processed data to one or more mobile terminals.

19. The method of claim 12, further comprising transmitting the processed data via broadcast to one or more mobile terminals.

20. The method of claim 19, wherein the transfer mode comprises an unacknowledged mode.

* * * * *